United States Patent Office 3,486,856
Patented Dec. 30, 1969

3,486,856
METHOD FOR THE QUALITATIVE IDENTIFICATION OF POLYVINYLCHLORIDE
Panagiotis L. Panagoulias, Highland Park, Mich., assignor to the United States of America as represented by the Secretary of the Army
No Drawing. Filed Mar. 2, 1967, Ser. No. 621,106
Int. Cl. G01n 33/44
U.S. Cl. 23—230   5 Claims

ABSTRACT OF THE DISCLOSURE

A method for the qualitative identification of polyvinylchloride elastomers comprising the steps of: dissolving a test sample in cyclohexanone; and reacting said dissolved test sample with an alkali hydroxide; said method yielding a chromophoric enol-ethylene compound when said test sample contains polyvinylchloride.

---

The invention described herein may be manufactured and used by or for the Government for governmental purposes without the payment to me of any royalty thereon or therefor.

The present invention relates to a method of qualitatively identifying polyvinylchloride under all conditions of occurrence. More particularly, the invention relates to a non-pyrolytic, substitution reaction with a color-producing group to produce a specific test for the presence of polyvinylchloride alone or as a compound or mixture with other elastomers.

Prior art methods for the identifications of elastomers in mixtures or compounds have consisted almost wholly of pyrolytic techniques utilizing the destructive distillation of the elastomer sample as a means of forming a test liquid. The vapors formed by the distillation are then passed into one or two reagents which often times yield ambiguous color-producing reactions. This ambiguity is particularly acute where a number of the compounds being tested for are present in the sample and all of the products of the distillation pass into the reagent solutions at the same time, yielding all of the variety of chromophoric groups produced by each of the individual distillation products. The present invention overcomes this difficulty, in the case of polyvinylchloride, by utilizing a color-producing substitution reaction, which produces a distinct color in the presence of that polymer, in combination with a procedure which eliminates the interference of other polymers or mixtures of polymers which may be present in the test sample.

It is therefore an object of the present invention to provide a method for the qualitative identification of polyvinylchloride under all conditions of occurrence.

Another object of the present invention is the provision of a specific and non-pyrolytic method for the qualitative identification of polyvinylchloride which method eliminates the interference of other elastomer compositions which may be present in the test sample as compounds of, or mixtures with, the polyvinylchloride elastomer.

The following description will make other objects and advantages of the present invention obvious to those skilled in the qualitative analytical arts.

According to the present invention, there is provided a method for the qualitative identification of polyvinylchloride under all conditions of occurrence including as a mixture or compound with other elastomers.

The invention further provides a method as described above which consists of reacting the polyvinylchloride molecule to form a color producing enol-ethylene compound.

More particular, the invention provides a non-pyrolytic method for the identification of polyvinylchloride under all conditions of occurrence comprising the steps of; dissolving the test sample in cyclohexanone and then reacting the dissolved sample with an alkali hydroxide to yield a color-producing reaction product.

In accordance with the invention a five gram portion of the sample is extracted with acetone according to ASTM Procedure D–297 for a period of 8–10 hours. A one gram portion of the extracted and room-temperature dried sample is then heated with 50 ml. of cyclohexanone at a temperature of about 140–150 degrees centigrade for approximately ½ hour so as to substantially dissolve the sample. The heating or dissolving temperature should approach, but never exceed the 156.7° C. boiling point of pure cyclohexanone. Ten ml. of this solution is then placed in a test tube with 0.20 gram of potassium hydroxide (KOH) and this solution boiled until the KOH dissolves. The appearance of a reddish-brown color indicates the presence of polyvinylchloride. Even in the presence of neoprene which possesses a molecular structure closely analogous to that of the polyvinylchlorides, the reaction is selective for polyvinylchloride.

The chemistry of the substitution reaction yielding the chromophore is explained as follows: the potassium hydroxide acts as a catalyst on the cyclohexanone, activating one hydrogen atom on the alpha carbon. This hydrogen atom, by means of tautomeric isomerism, migrates to the carbonyl-oxygen forming an enol and an ethylenic double bond between the carbonyl and the alpha carbon which has lost the activated hydrogen. This enol-ethylene grouping is largely responsible for the color production.

The enol thus formed reacts with the potassium hydroxide, the potassium atom substituting for the enol hydrogen atom which is drawn off to form water. The compound thus formed reacts with the vinylchloride to yield a further color producing compound.

The reaction is illustrated below:

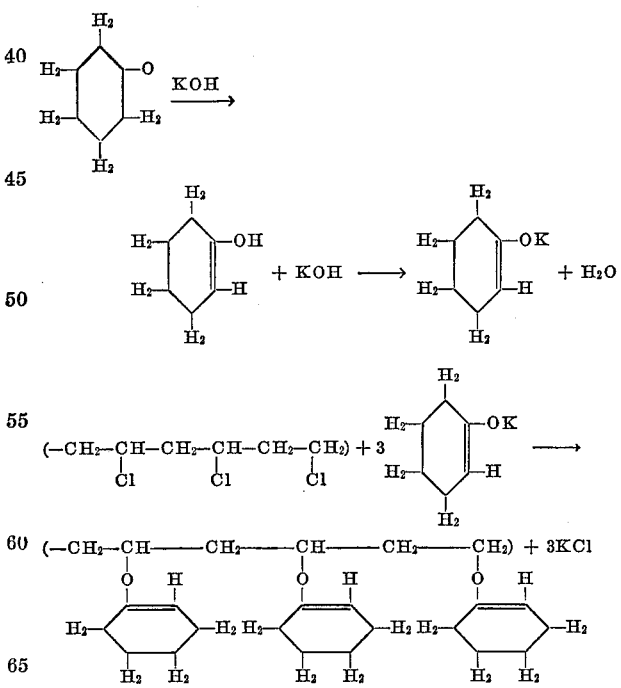

Any alkali hydroxide may be substituted for the potassium hydroxide utilized in the above example, since attack upon the cyclohexanone molecule will occur in substantially the same manner when sodium or lithium hydroxide is used or when potassium hydroxide is used.

What is claimed is:
1. A method for the qualitative identification of polyvinylchloride comprising the steps of:
   (a) dissolving a test sample in cyclohexanone to form a test sample solution; and
   (b) reacting said test sample solution with an alkali hydroxide to produce a chromophoric enol-ethylene compound when said test sample contains polyvinylchloride.
2. A method in accordance with claim 1 wherein said test sample is extracted with acetone for an 8–10 hour period, according to ASTM Procedure D–297, prior to being dissolved in said cyclohexanone.
3. The method of claim 1 wherein said test sample is dissolved in said cyclohexanone by heating to a temperature approaching but never reaching the 156.7° C. boiling point of said cyclohexanone.
4. A method in accordance with claim 3 wherein said test sample is extracted with acetone for an 8–10 hour period, according to ASTM Procedure D–297, prior to being dissolved in said cyclohexanone.
5. A method in accordance with claim 1 wherein said chromophoric enol-ethylene compound has a reddish-brown color.

References Cited

Wake, W. C., The Analysis of Rubber and Rubber-Like Polymers, Maclaren & Sons, Ltd, London, 1958, page 54. Copy in POSL, TS1892W3.

ASTM Standards on Rubber Products, 1957. Copy in POSL, TS1892A45.

MORRIS O. WOLK, Primary Examiner

R. M. REESE, Assistant Examiner